J. W. THOMAS.
Plows.

No. 151,808.　　　　　　　　　　　　Patented June 9, 1874.

WITNESSES.
E. Wolff
C. Sedgwick

INVENTOR.
J. W. Thomas
BY
ATTORNEYS.

UNITED STATES PATENT OFFICE.

JOHN W. THOMAS, OF SILVER SPRINGS, TENNESSEE.

IMPROVEMENT IN PLOWS.

Specification forming part of Letters Patent No. 151,808, dated June 9, 1874; application filed January 5, 1874.

*To all whom it may concern:*

Figure 1:
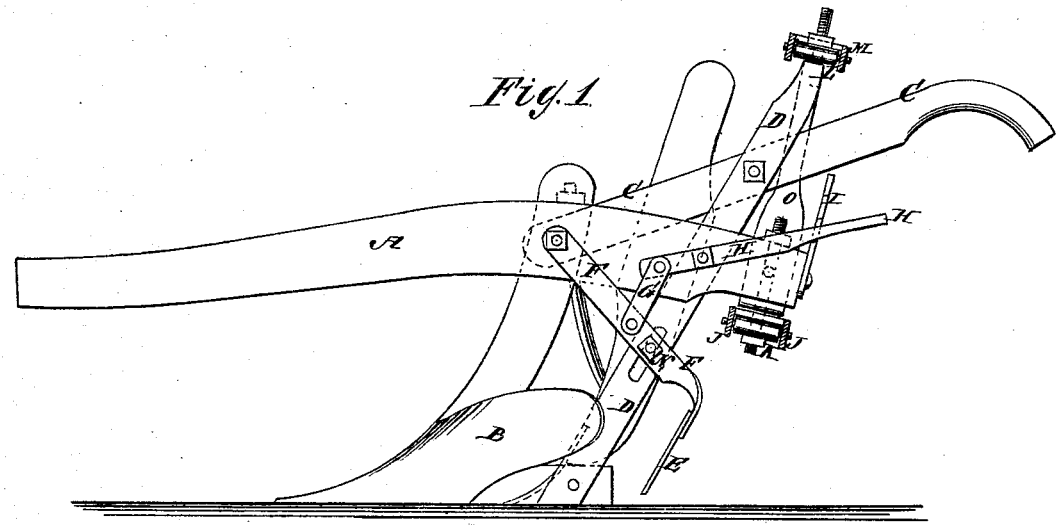
Figure 2:
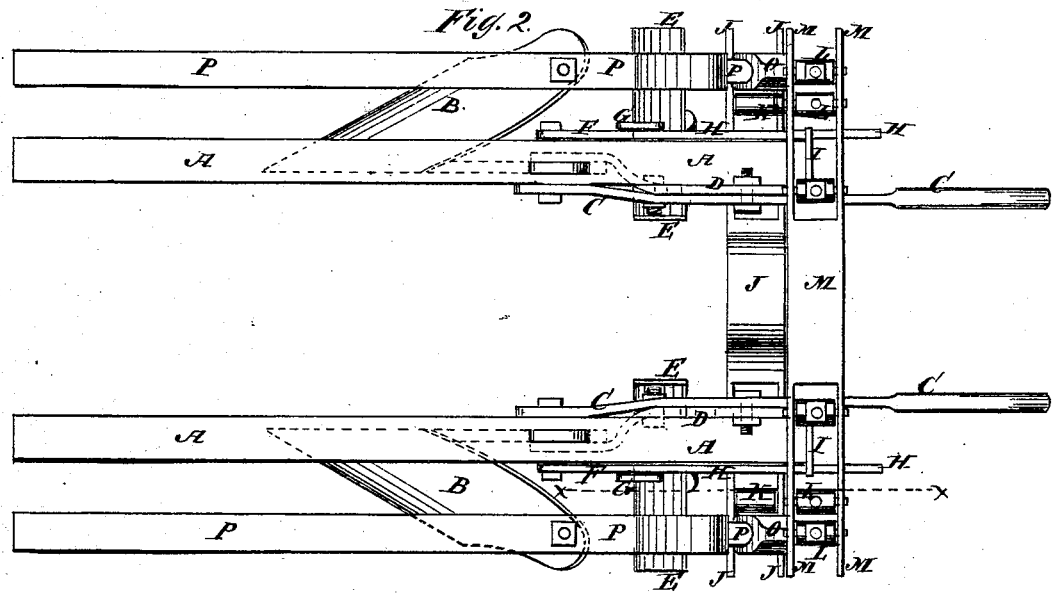
Figure 3:
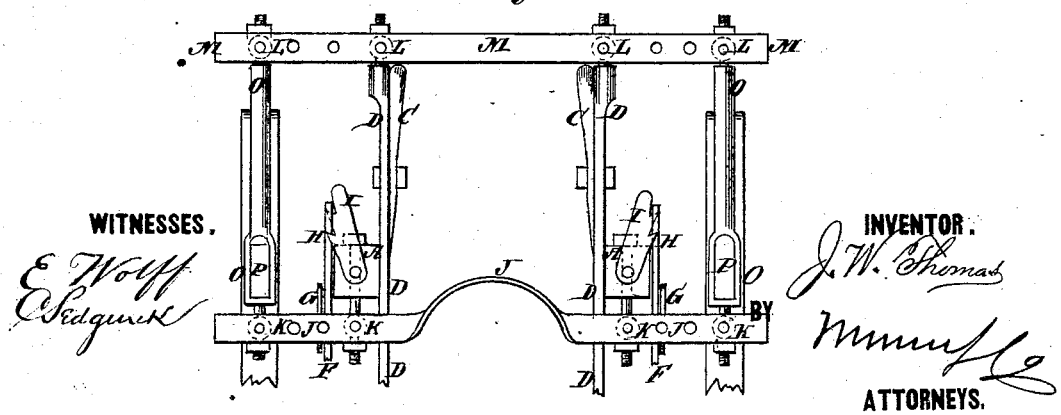

Be it known that I, JOHN W. THOMAS, of Silver Springs, in the county of Wilson and State of Tennessee, have invented a new and useful Improvement in Plows, of which the following is a specification:

Figure 1 is a side view of my improved plow and scraper, partly in section, through the line $x\,x$, Fig. 2. Fig. 2 is a top view of the same. Fig. 3 is a rear view of the same, part being broken away.

Similar letters of reference indicate corresponding parts.

The invention relates to the combination of pivoted blocks or rollers and cross bars or plates for connecting the plow beams and standards, whereby the plows are allowed movement in any direction, one relative to the other, all as hereinafter fully described.

A are the beams, to which the plows B are attached in the ordinary manner. C are the handles, the forward ends of which are bolted to the beams A, and their rear parts are bolted to the upwardly-projecting parts of the rear standards D. E are the scrapers, which are attached to the rear end of the bars F, the forward ends of which are bolted to the beams A. The rear parts of the bars F are bent at such an angle as will bring the scrapers E into proper working position. To the middle part of the bars F is pivoted the lower end of the short connecting-bars G, the upper ends of which are pivoted to the levers H, which are pivoted to the beams A, and the rear ends of which project to the rearward into such a position that they may be conveniently reached and operated by the plowman to raise and lower the scrapers E, as required. The levers H, and through them the scrapers E, are secured in any position into which they may be adjusted by the notched or toothed bars I attached to the rear ends of the beams A, and which take hold of the said levers H. The rear ends of the beams A are connected and held in their proper relative positions by the bar or plate J, the middle part of which is arched to enable it to pass readily over the plants. The end parts of the bar or plate J are slotted longitudinally, and to the arms thus formed are pivoted short transverse rollers K, which are bolted to the rear ends of the beams A, so that the plows may be turned to one or the other side to guide them while they are all the time held at the proper distance apart. Several holes are formed in the arms of the slotted bar or plate J, to receive the ends of the rollers K, to enable the plows to be readily adjusted at any desired distance apart. To the upwardly-projecting ends of the rear standards D are attached short rollers L, the ends of which work in holes in the arms of the slotted bar or plate M, so as to keep the plows always parallel with each other. The plate M and rollers L are exactly like the plate J and rollers K, except that the middle part of the plate M does not require to be arched. N are bolts, which pass through slots in the rear standards D, and through holes in bars F of the scrapers E, to which they are secured by two nuts screwed upon the said bolt, one upon each side of the said bar F, so that by adjusting the said nuts the scrapers may be adjusted to work closer to or farther from the row of plants, as may be desired. O is a bar or standard, attached to the rear end of the beam P of a shovel-plow. The upper ends of the standards O are attached to the rollers L of the plate or bar M, and their lower ends are attached to the rollers K of the lower bars or plates J.

By this construction, and by reversing the plows, two shovel-plows may be connected with the turn-plows for plowing out the row. This construction also enables two right-hand plows to be used for throwing the first two furrows. The same construction enables the plows to be arranged for breaking out the middle of the row.

By detaching the connecting device and attaching another handle, each plow may be used as a single plow.

Having thus described my invention, what I claim as new, and desire to secure by Letters Patent, is—

The combination of the standards O with the bars or plates J M, and their rollers K L, attached to the beams A and rear standards D of the plows, and with the beams P of two shovel-plows, substantially as herein shown and described.

J. W. THOMAS.

Witnesses:
C. F. PATTEN,
H. H. McCLAIN.